3,510,299
METHOD AND MATERIAL FOR THE PRODUCTION OF CONTINUOUS-TONE ELECTROPHOTOGRAPHIC IMAGES
Clifford E. Herrick, Jr., 19845 Skyline Blvd., Los Gatos, Calif. 91030; John W. Weigl, 534 Wahlmount Drive, West Webster, N.Y. 14580; and Paul Chebiniak, 296 Deyo Hill Road, Johnson City, N.Y. 13790
Continuation-in-part of abandoned application Ser. No. 19,884, Apr. 4, 1960. This application June 26, 1967, Ser. No. 661,156
Int. Cl. G03g 5/08
U.S. Cl. 96—1.7    12 Claims

ABSTRACT OF THE DISCLOSURE

This document describes the manufacture of a light-sensitive electrophotographic element by mixing sensitized zinc oxide with an insulating black powder and dispersing the resulting mixture in a resin of high dielectric strength. The resultant dispersion is coated in a relatively conducting support. The black electrophotographic element is exposed to an optical image and the latent electrostatic image rendered visible by development using a light-colored toner powder. The resulting image has strikingly improved sensitometric characteristics, as exemplified by excellent continuous-tone rendition.

RELATED APPLICATION

This application is a continuation-in-part of copending application Ser. No. 19,884, filed Apr. 4, 1960, now abandoned.

STATE OF THE ART

Electrophotography employs a composite photographic medium comprising a light-sensitive coating on a base which is insensitive to light. The base sheet, in most present processes, is chosen preferably to be more electrically conductive than the light-sensitive coating in the presence or absence of light and the base is normally connected to electric ground potential during processing. Bases of this type are aluminum sheet and paper, filled with conductive carbon. Alternatively, a non-electrically conductive base material may be used, provided a relatively conductive interlayer is provided between the base and the light-sensitive layer. Examples of such systems include glass plates treated with conductive tin oxides and dry paper overcoated with a vacuum-deposited aluminum film or a layer of a conductive pigment in a suitable binder resin. If conductive interlayers of this type are used, they are normally connected to ground potential during processing. Finally, it is known that even nonconductive base materials, such as untreated paper, may be used for electrophotography provided the base material is charged during processing to a polarity opposite that used on the photoconductor surface.

The photosensitive layer generally consists of a photoconductive material dispersed in an electrically insulating binder. The term "photoconductive," as used in the present specification and claims, means having the property of being able to conduct electricity better, usually substantially better, in light than in the dark. "Conductive" and "electrically-conductive" materials are those which have good electric conductivity regardless of the presence or absence of light; likewise, "insulating" or "electrically insulating" materials are those which have poor electric conductivity, regardless of the presence or absence of light.

With all of these electrophotographic elements, it is customary to deposit an electrostatic charge upon the face of the light-sensitive layer while the backing layer is either connected to ground or subjected to an approximately equivalent charge of opposite polarity, as outlined above. The light-sensitive layer is then illuminated by a light and shadow pattern which represents the image to be reproduced. Wherever it is illuminated by actinic radiation, the hitherto insulating photoconductive material becomes electrically at least somewhat conductive and, therefore, any previously deposited electrostatic surface charge is disspiated conductively according to the actinic exposure which each area of the element has received. In this manner, an electrostatic latent image is formed, the greatest surface charge density remaining in unexposed areas and the least in maximally illuminated portions of the light-sensitive layer.

The latent image is then rendered visible by development with electrostatically charged pigment particles, or "toners," which may be applied to the image as airborne powder clouds, as suspensions in insulating liquids of low dielectric constant, or as dry particles adhering to oppositely charged "carrier" particles of substantially larger size, such as iron powder or glass beads. Depending on the relative polarities of electrostatic latent image and toner, the latter adheres differentially to charged and discharged areas and thereby renders them differentially visible.

In direct-image processes the toner is made to adhere permanently to the photoconductive layer, by drying, thermal fusion, or the action of solvent vapor. In offset processes, the pigment image is transferred from the photo-sensitive layer by contact to a receiving sheet and affixed thereto. The general outline and many details of this process are well known to those skilled in the art art and need no further elaboration.

As commercially practiced, electro-photography most often uses selenium compounds as the photoconductive material in the photosensitive layer. However, these compounds are so expensive that they can be used, practically only in offsetting systems which require special provision for contact with the print paper, image reversal, etc.

Although a wide variety of photoconductive materials are known which can be used for the production of electrophotographic media, zinc oxide is one of the most interesting. This is due to the ease and economy with which it can be manufactured with well-defined photoelectric properties, the effectiveness with which large negative surface charges may be applied to it by corona discharge or other means, and the high ratio of effective light-to-dark conductivities which permits the formation of excellent electrostatic images. In preparing electrophotographic plates or sheets, the zinc oxide is dispersed in a suitable solvent with an amount of insulating resinous binder which is sufficient to cause the particles to adhere to each other and to the base without insulating them exccessively from each other. The suspension of pigment and binder is coated and dried on the base as a film having a thickness of the order of one thousandth of an inch. Electrophotographic media employing zinc oxide are relatively inexpensive and it is economically feasible to use such media for direct development of the latent electrostatic image, to avoid the difficulties and machinery costs involved in offset procedures.

Zinc oxide has a major handicap for use in an electrophotographic medium: electrophotographic plates prepared with ordinary white zinc oxide are sensitive primarily to ultraviolet radiation and do not react optimally to the visible spectrum. Thus, they are of limited use for reproduction of images of certain colors. Also, an ideal latent electrostatic image cannot be produced on white zinc oxide using ordinary visible light.

It is well known that panchromatic response in electrophotographic materials can be attained by the use of intrinsically colored photoconductors as light-sensitive elements. For instance, B. Paris (U.S. Pat. 2,803,541) and Ulbrich (U.S. Pat. 2,803,542) describe admixtures of tellurium and arsenic to photoconductive selenium which render this photoconductor substantially black and therefore panchromatic. Sugarman (U.S. Pat. 2,862,815) and Kallmann (U.S. Pat. 2,845,348) have described panchromatically sensitive, inherently deeply colored photoconductors such as lead oxide, lead sulfide, cadmium selenide and arsenic trisulfide which may be coated in resinous suspensions upon fibrous bases. Electrostatic images formed on these materials may be rendered visible by the application of white or light colored toners.

Carlson (U.S. Pat. 2,221,776) first mentioned the possibility of forming white images over black photoconductors by means of white toner powders such as ZnO, $TiO_2$ and lycopodium powder. Sugarman (U.S. Pat. 2,758,524) used magnesium silicate for producing white images on selenium. Also suggested have been chalk or fluorescent powders (British Pat. 798,097). In a distantly related process, Greig and Young (U.S. Pat. 2,735,784) and Greig (U.S. Pat. 2,735,785) describe the application of white polyvinyl chloride powder, usually mixed with zinc salts or oxide, to white zinc oxide layers. This toner is then darkened, however, by a subsequent thermal reaction. A white "liquid toner" consisting of positively charged, resin-treated zinc oxide particles suspended in an insulating liquid has been described by Metcalfe and Wright (German application 1,047,616) published Dec. 24, 1958). This is applicable to most dark photoconductive layers as are not dissolved by the liquids used in the toner.

As a practical matter, zinc oxide is by far the most successful presently known photoconductor used for the formation of permanent visible images directly upon a photoconductive surface. A number of procedures are known by which white zinc oxide may be rendered panchromatically sensitive. These treatments also usually alter the color of the zinc oxide and in addition may change its crystal form. For example, an orange-brown, panchromatically sensitive form, suitable for electrophotography, may be prepared by the "ammonium carbamate process," described, for example, by Thomsen (U.S. Pat. 2,727,807 and U.S. Pat. 2,727,808). It is further known that the white, ultraviolet-sensitive, photoconductive form of zinc oxide may be sensitized to visible light by sorbing suitable dyes such as chlorophyll, rose bengal, fluorescein and methyl green to the surface of the particles. [Ya. K. Putseiko and A. A. Terenin, Doklady Akad. Nauk. SSR 90, 1005 (1953); A. Terenin, Ya. K. Putseiko and I. Akimox, J. Chim. Phys. 54, 716–25 (1957); H. Greig, Germ. appln. R 16768–IV a/57b to R.C.A.; M. L. Sugarman, Proc. 7th ann. mt'g. of TAGA, May 1955; H. J. Gerritsen, W. Ruppel and A. Rose, Helvetica Physica Acta 30, 504–12 (1957)]. Such dye sensitization extends the spectral response of the zinc oxide photoconductor into the visible spectrum in a manner somewhat analogous to the optical sensitization of silver halide emulsions by various sensitizing dyes.

These sensitized zinc oxides, when employed in the light-sensitive layers of direct-image electrophotographic media, display two disadvantages which make their use unfeasible. The resulting photographs, having a pastel background, are ugly and aesthetically unacceptable; prints produced therefrom often have stained background areas due to the presence of the dye. In addition, electrophotographic elements containing dye-sensitized zinc oxide are extremely contrasty, yielding poor response to continuous tones in the original light pattern and causing the plates to have an objectionably narrow exposure latitude.

Both the conventional diazotype and the conventional electrophotographic processes are well known to be inherently contrasty, and are consequently lacking in continuous-tone rendition and reasonable exposure latitude. Herrick [Journal of Optical Soc. of America 42, 904–10 (December 1952)] has published typical curves for the positive diazotype process. As will be seen below, curves showing the relationship between developed density and visible light exposure under typical exposure conditions for two conventional electrophotographic materials, which are substantially alike except that one of them is based on white zinc oxide and the other on rose-bengal-dyed zinc oxide as photoconductive elements, have contrast slopes (called "gamma" in the photographic literature) up to 8–10 in value. It is worth noting that the dyed zinc oxide layer, which excels the other 30-fold in sensitivity to visible light and, in addition, possesses panchromatic response, has a much steeper sensitometric response than the white layer. It therefore suffers even more grievously than the white from excessive contrast and poor exposure latitude. The reason for this is believed to be related to the intense visible light absorption by the dye layer, which causes an excessively high concentration of electrons to be formed at the surface of the zinc oxide. In any event, the sensitometric curves of dyed zinc oxide layers are so steep as to make the exposure latitude very small. In practical use, this narrow latitude is unacceptable since, with an average original, the exposure time becomes very critical indeed. Hence, such materials are commercially unacceptable for this reason.

It is well known in the art that electrostatic latent images may be rendered visible by development with electrically charged powders which adhere differentially to the latent image, depending on the relative electric polarities of powder and surface charge. If the electroscopic powder has the same polarity (relative to ground) as the surface charge, it is repelled from the latter and adheres preferentially to areas discharged by illumination. In such "repulsion" development, using a dark toner powder on a light photographic medium, a negative or "color reversed" image is produced.

If on the other hand, the toner powder carries a charge opposite in polarity to that of the residual charge on the latent image, the powder is deposited preferentially upon the areas carrying residual charge. We then speak of "attraction" development, which, using a dark toner on a light medium, gives a positive image. Examples of both types of development are disclosed, for example, by C. F. Carlson in U.S. Pat. 2,297,691.

The over-all photocopying process may be made to yield either direct (positive) or reversed (negative) images. By a direct copy we mean that dark areas on the original copy are rendered dark in the final print, and that light areas on the original are rendered light. This occurs, e.g., in a common diazotype copy. In a reversed copy, the opposite is true: dark areas on the original appear light and light areas dark. This is the case, e.g., in the production of ordinary silver halide "photostats."

DESCRIPTION OF THE INVENTION

There exists a great need for an electrophotographic process which utilizes the cheapness, color response, high light sensitivity, and exceptionally good photoelectrical properties of panchromatically sensitioned zinc oxide, but which offers substantially flattened sensitometric response with concomitant wider exposure latitude. The process now to be described by us is capable of introducing such sensitometric changes in the materials described and produces a more attractive photograph.

We have learned to overcome the aesthetic and sensitometric shortcomings of colored photoconductive zinc oxide layers by providing an electrophotographic medium in which the sensitized zinc oxide is mixed with an insulating black powder. This results in a darkly colored, preferably black, light-sensitive layer which depends entirely on the photoconductivity of the zinc oxide to make the medium operative and which hides the objectionable appearance of the pastel-colored zinc oxide. In the process of this invention, the latent electro-static image is developed by using a white or light-colored toner on the dark medium. It has been found, quite unexpectedly, that direct or attraction development enables continuous-tone prints to be made, an effect not often possible in most electrophotographic processes.

It is, accordingly, an object of the present invention to provide substantially black zinc oxide electrophotographic media usable with light-colored developers which have greatly improved sensitometric characteristics.

It is another object of this invention to provide panchromatically sensitized, darkly colored zinc oxide electrophotographic media capable of continuous-tone image rendition upon the development with light-colored toners.

It is a further object of this invention to provide zinc oxide electrophotographic media which are highly sensitive to visible light, and yet aesthetically acceptable, by using substantially black and white (rather than pastel-colored) layers and developers.

It is a still further object of this invention to provide zinc oxide electrophotographic plates capable of continuous-tone rendition of reversed (or "negative") X-ray, ultraviolet, or visible light images as light-colored toner patterns on a dark background.

Other objects and purposes of this invention will become apparent as the description proceeds.

The present invention, according to which the aforesaid objects are achieved, is based upon the discovery that reversed electrophotographic images of greatly improved sensitometric properties can be produced by using as the photosensitive element a darkened photoconductive zinc oxide layer. Such plates are made by mixing the zinc oxide photoconductor with a black, substantially insulating black powder. Of these, insulating forms of carbon black powder, such as channel-blacks are preferred. See Kirk-Othmer, "Encyclopedia of Chemical Technology," 2nd edition, volume 4, p. 251. Other black powders which can be employed are Asphaltum, Gilsonite, asphalt, etc. Manganese dioxide, cupric oxide, finely powdered metals, ferrous oxide, magnetite, cobaltic oxide, lead sulfide, lead sub-oxide, magnesium ferrite, powdered dyes such as nigrosine and others, including mixtures of these, may be employed when suitably insulating forms are available. These black insulating powders are mixed with the zinc oxide in an amount sufficient to produce the desired blackness in the medium. It has been found that a mixture in which the black insulating powder comprises from 1 to 50 percent, preferably about 1.25% to one-third of the weight of the zinc oxide, produces images of excelllent quality.

The sensitized zinc oxide with which the black powder is mixed is produced by adsorbing to the surface of the zinc oxide suitable dye sensitizers such as rose bengal, fluorescein, chlorophyll, methyl green, oxonols, hemioxonols, cyanines, and the like. As is well known, such dyes sensitize zinc oxide to visible light by extending its spectral response in much the same manner as sensitizing dyes extend the spectral response of silver halide emulsions.

In general, the electrophotographic plates or elements of the type used herein are obtained by coating a preferably relatively conducting base with a light-sensitive insulating composition prepared by intimately mixing a mixture of photoconductive zinc oxide, a black insulating powder of high dielectric resistance in a binder and a solvent. After evaporation of the solvent, the resulting adherent layer can be electrostatically charged in the dark, which charge is rapidly dissipated on exposure to light.

In practicing the invention, an intimate mixture of photoconductive zinc oxide, a black insulating powder and a resinous binder material hvaing an electrical volume resistivity of about $10^{10}$ to about $10^{19}$ ohm-cm. in a solvent for the binder are mixed for a period of time sufficient to insure intimate mingling of the particles and the resin. The resulting dispersion is then coated on and dried on a preferably relatively conducting base (such as paper or metal foil) and the resultant plate can be electrostatically charged for use in the electrophotographic process.

The insulating resin or binding materials should bond tightly to the base plate after evaporation of the solvent and provide an efficient dispersing medium for the zinc oxide particles. The binder should also have a high electrical volume resistivity so that it will not discharge the plate in the dark. It has been our finding that the electrical resistivity of the binder should not fall below about $10^{10}$ ohm-cm.

Suitable binders having the aforementioned electrical properties which can serve as carriers for the photoconductive zinc oxide particles include various natural and artificial resins or waxes, such as silicone, alkyd, epoxy, and phenolformaldehyde resins, cellulose esters, etc., cellulose ethers, vinyl resins, e.g., polyvinyl actate, acrylics, and polystyrene, waxes, paraffin wax, carnuba wax and natural resins such as shellac.

The support or base carrying the photoconducting zinc oxide layer is preferably electrically conductive; suitable materials include metal sheets such as aluminum foil, stainless steel sheets, copper sheets and the like. Carbon-filled black paper or ordinary white paper can also be used as a support, but such materials must be preferably rendered conductive by suitable processing as, for instance, by treating the paper with humectants or "antistatic" compounds. If non-conductive bases (such as dry paper) are used, provision must be made for reverse-potential charging of the uncoated side, as disclosed in German application 1,030,183 dated May 14, 1958.

The toner powders used in developing the electrostatic images are well known in the art and generally consists of resins of low melting points, powdered metals, chalk, lycopodium resin or powdered resin pigment mixtures. We prefer to formulate positively charged dry white toner powders, for instance, by thoroughly dispersing a pigment in a solution of resin to form a slurry. After evaporation of the solvent, the residue is finely ground and particles capable of passing a 200 mesh per inch sieve are then used as toner powders. Typical of the resins used in formulating toner powders as described above include melamine-formaldehyde resins, polystyrene, polyvinyl acetate, hydrocarbon resins, carnauba wax and other materials of high resistivity and high dielectric strength. The toner powders are then mixed with loosely packed, oil-free iron filings in the ratio 1 to 5 by volume and the resulting mixture is applied preferably by a "magnetic brush" applicator of the type described in U.S. Pat. 2,786,439 in the usual manner.

The toner powders may also be applied by any of the commonly accepted methods that are well known in the art as, for example, by means of a powder cloud, or by deposition of toner from liquid suspensions or emulsions. The powder may also be applied by "cascading" with a carrier such as coated glass beads or iron filings, or without any carrier whatsoever, it being understood, of course, that the carrier materials may alter the original electric charge on the toner powder.

The developed or toned images may be fixed by means known in the art, such as, for example, by drying, heating or exposure to the vapor of a suitable solvent in which the toner resin becomes tacky.

THEORY

A possible explanation of the efficacy of this invention is given below. However, the invention described herein should not be considered circumscribed by this explanation.

The surface of an electrophotographic medium may be given a static electricity charge of either negative or positive character and the toner used to develop the latent electrostatic image on the medium may have either a positive or negative charge. The types of development involved in the four possible resulting situations are given in Table I below.

TABLE I.—ELECTRICAL RELATIONSHIPS

| Photosensitive layer surface electrostatic charge | Toner powder electrostatic charge | Type of development | Areas of photosensitive layer to which toner sticks |
| --- | --- | --- | --- |
| + | + | Repulsion | Exposed. |
| + | − | Attraction | Unexposed. |
| − | + | do | Do. |
| − | − | Repulsion | Exposed. |

Thus, when an original having a dark image on a white background (or an opaque image on a transparent background) is copied and developed by attraction development, the toner will stick to the unexposed portions of the electrophotographic medium, that is, to the area corresponding to the dark or opaque portions of the original, to give a direct or positive image, when a dark toner is employed, or a reversed or negative image when a light toner is employed. The converse occurs in repulsion development techniques. Table II summarizes the image types obtained in the four possible situations.

TABLE II

| Type of development | Attraction | Repulsion |
| --- | --- | --- |
| Black toner, white medium. | Direct (Situation A). | Reversed (Situation B). |
| White toner, black medium. | Reversed (Situation C). | Direct (Situation D). |

The theory upon which our improved electrophotographic process is based is related generally to images formed by all kinds of light scattering centers upon a black background. It has long been known that images may be formed by light scattering white pigments or gas bubbles deposited in various ways over a black background. For example, in the so-called ferrotype or tintype silver halide processes, the image, instead of being formed by a light absorbing black pigment, is made up of a light reflecting white pigment. Such a process is described in U.S. Pat. 1,605,585. "Vesticular" images, in which light scattering bubbles of gas are formed imagewise over a black background, were first described in British Pat. 402,737 and later improvements were described by Herrick et al. in U.S. Pat. 2,703,756. Among the remarkable properties of layers in which the image is reflecting or refracting is the fact that such layers produce negatives when viewed by transmitted light (as transparencies) but produce positive images when they are viewed by reflected light, especially if the transparency is placed against a darker background. Thus, the mere act of placing such a transparency against a dark background brings about a photographic reversal.

It was first shown by Herrick many years ago (U.S. Pat. 2,703,756) in the case of the diazotype vesicular image process that the formation of white images against a black background by means of any light-*scattering* particles or bubbles is an inherently less contrasty process than the formation of black images over a white background by means of light-*absorbing* particles. The primary reason for the much improved continuous-tone sensitometric properties of the "white-on-black" process, as we may call it, is due to the fact that (1) visual density prevails at zero exposure and (2) only very small amounts of reflectance (from, e.g., a white pigment) are required to cause large decreases in density from that shown by the black-coated paper at zero exposure. This can be shown to be true for any process in which the image is formed reflectively above a darker background. Quite generally, "toe" (or low density) contrast is decreased and shadow (or high density) contrast is raised by this means.

For these reasons, the density change produced on a black background by attraction development with a given small amount of white powder is much greater than that produced over a white sheet by an equal amount of substantially black powder. By white-on-black attraction development, inherently contrasty, positive-working photographic materials can be used to produce reversed prints having substantially more continuous-tone properties than their conventional black-on-white counterparts.

If, on the other hand, the darkened zinc oxide photoconductive plate is subjected to repulsion toner powder, the resulting positive electrophotographic image is extremely contrasty—more so, in fact, than its conventional black-on-white counterpart. This property makes the blackened zinc oxide electrophotographic sheet useful for certain applications where extremely high contrast is desired, for example, the recording of spotlight galvanometer traces, facsimile system outputs and line copy.

In order to illustrate our invention further, reference is now made to the accompanying drawings, in which.

FI1. 5 shows the sensitometric curve of an electrophotographic element in which the black photoconducting layer is negatively charged zinc oxide and the image is repulsion-developed by means of electro-negative white toner powder (Situation D).

Figure 2:
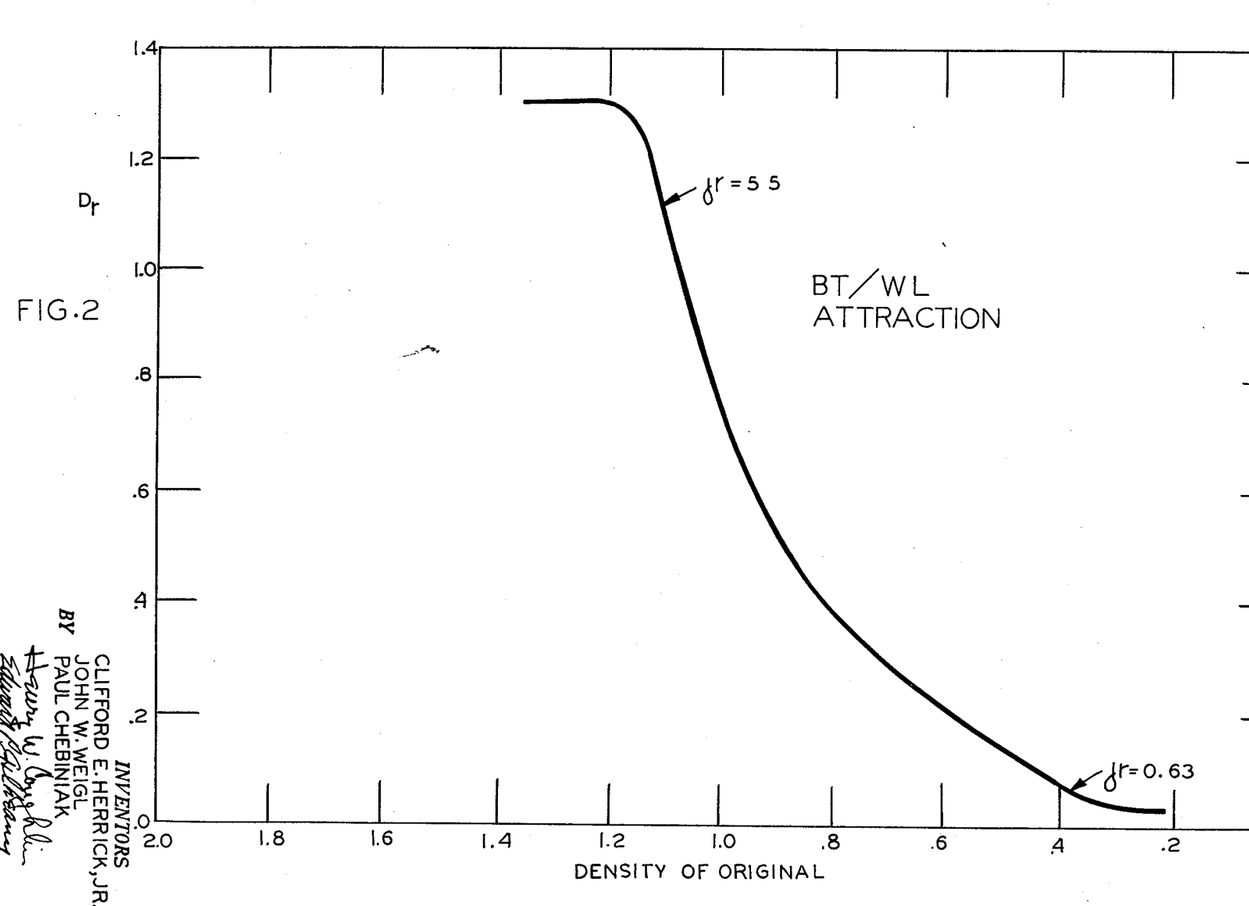
FIG. 2 is a sensitometric curve (reflection density vs. logarithm of exposure) of a typical conventional electrophotographic element in which conventional white zinc oxide dispersed in a resin binder is used as the photoconducting layer and the image is attraction-developed with black toner (Situation A).
Figure 3:
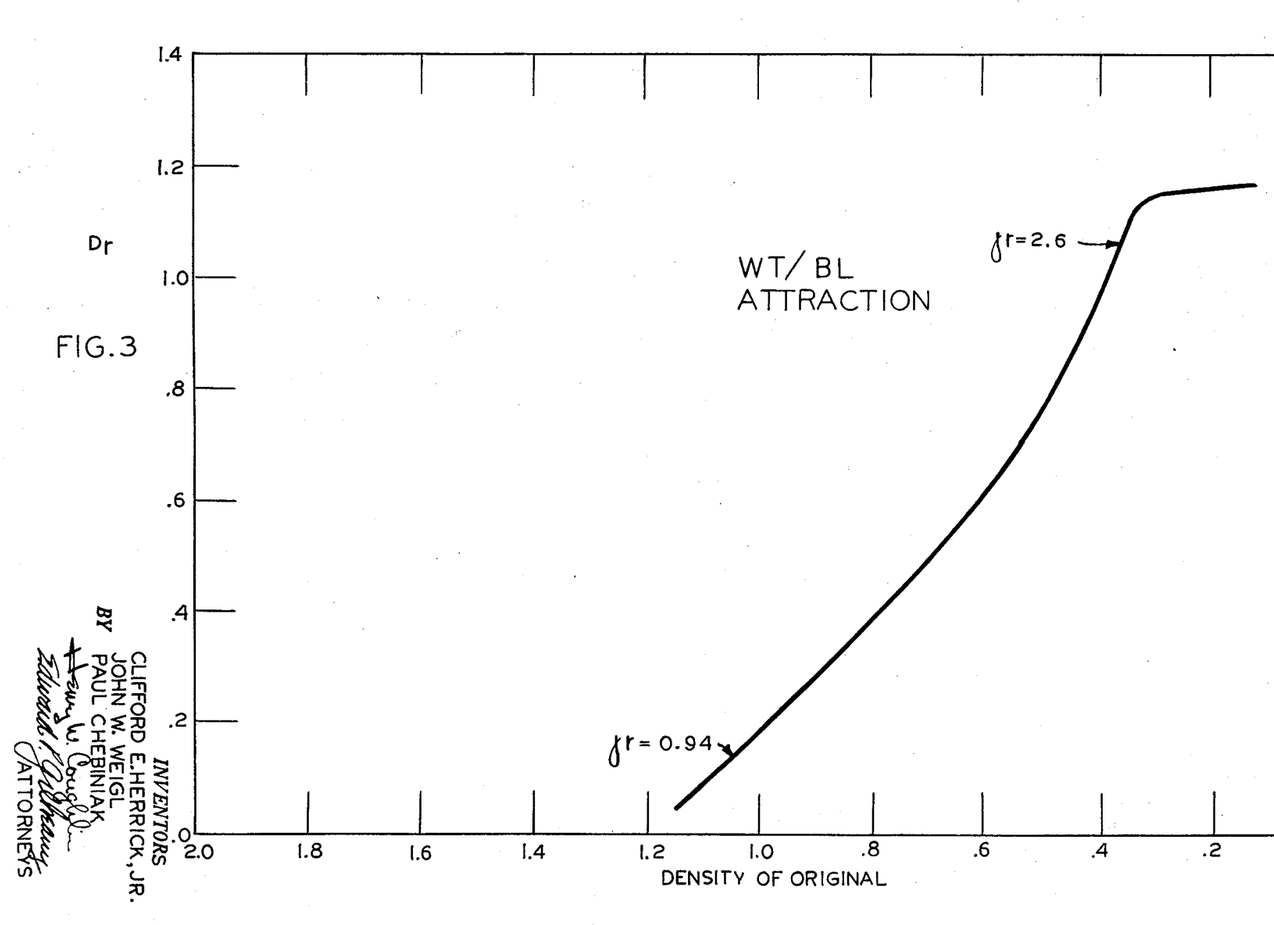
FIG. 3 is a sensitometric curve of our improved electrophotographic element employing zinc oxide in a black photoconducting layer in which the electro-negative charge latent image is attraction-developed with white electro-positive toner powder (Situation C).
Figure 6:
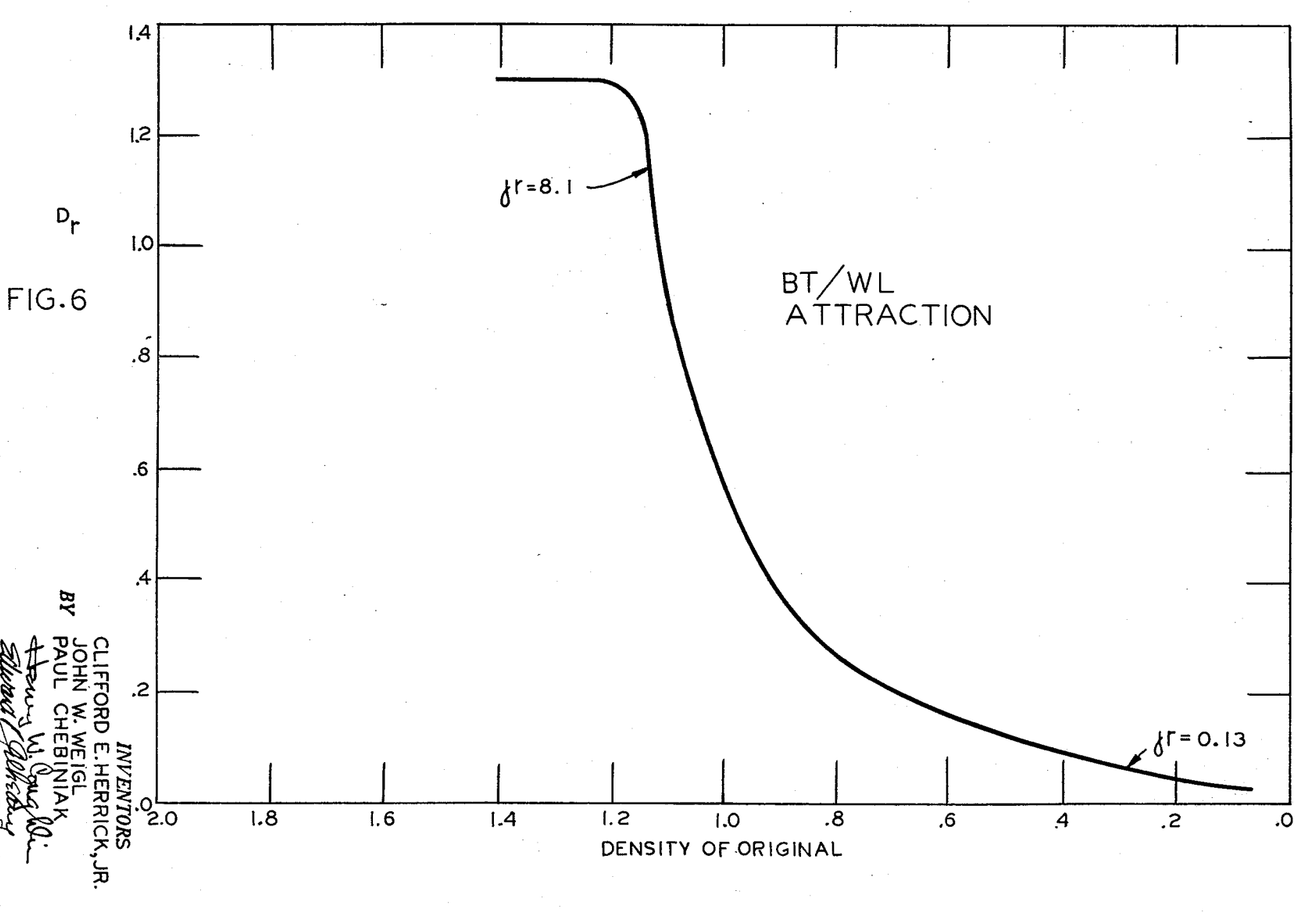
FIG. 6 is a sensitometric curve of a conventional, light colored, rose-bengal-dyed zinc oxide photoconducting layer, attraction-developed by means of an electro-positive black toner powder (Situation A).
Figure 7:
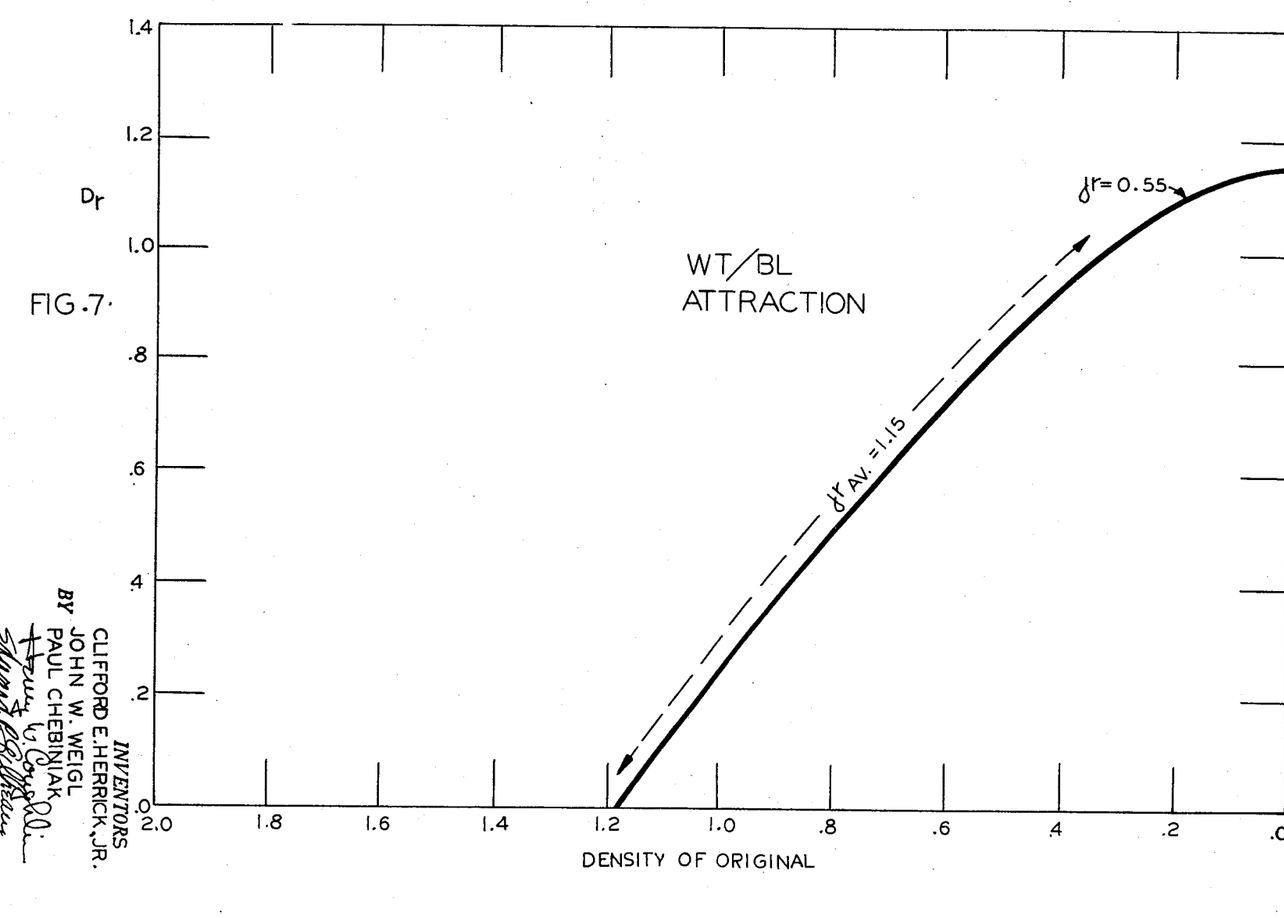
FIG. 7 is the sensitometric curve of a black electrophotographic element using rose-bengal-sensitized zinc oxide as the photoconductive material wherein the image is attraction-developed by means of electropositive white toner powder (Situation C).

Thus, FIGS. 2 and 6 represent situation A and it will be noted that the sensitized zinc oxide photoconductor material produces a curve with a much steeper gradient. FIGS. 3 and 7 both represent situation C and it can be seen that the gradient of FIG. 3 is steeper than that of FIG. 7, so that in situation C the sensitization of the zinc oxide brings about a slight flattening of the sensitometric response curve.

Figure 4:
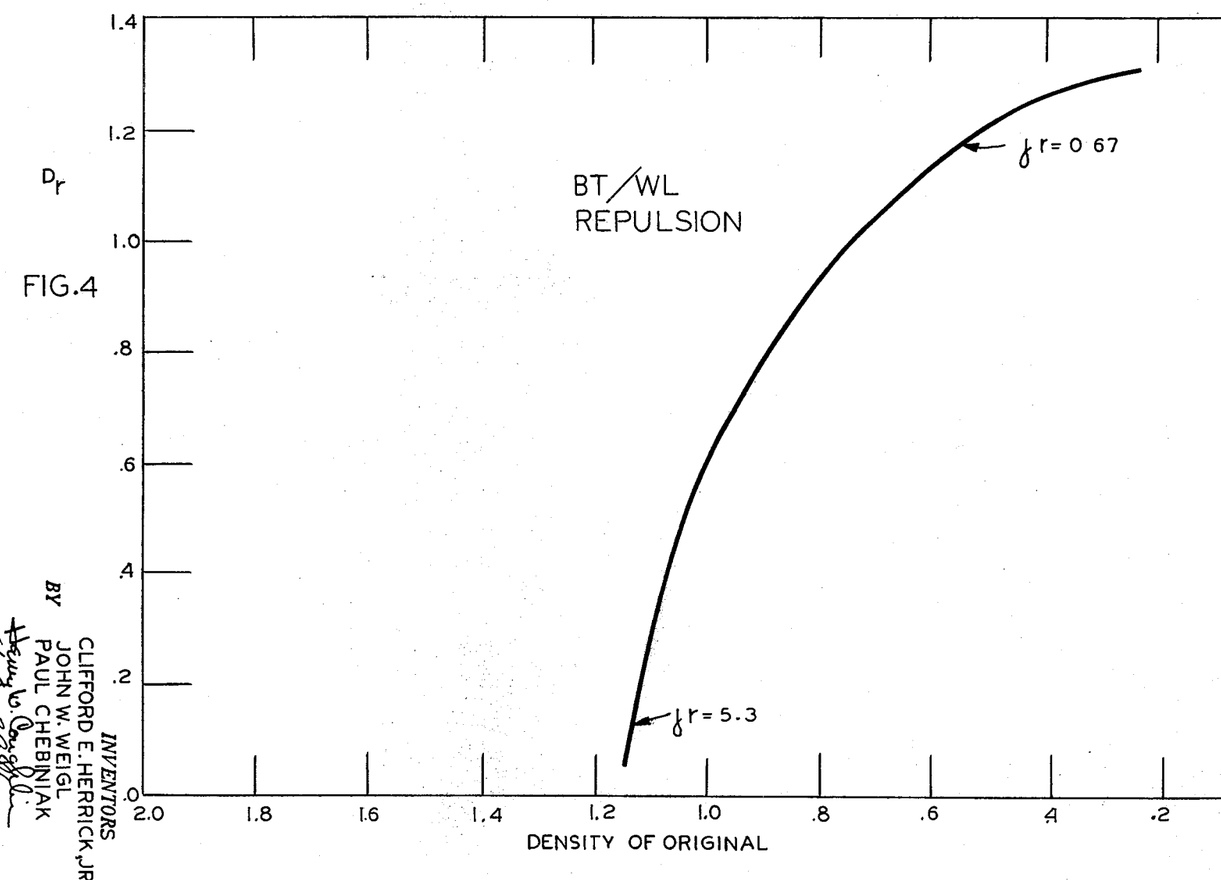
FIG. 4 is a sensitometric curve of an electrophotographic element using negatively charged conventional white zinc oxide as the photoconducting layer using repulsion development by means of a black electro-negative toner (Situation B).
Figure 5:
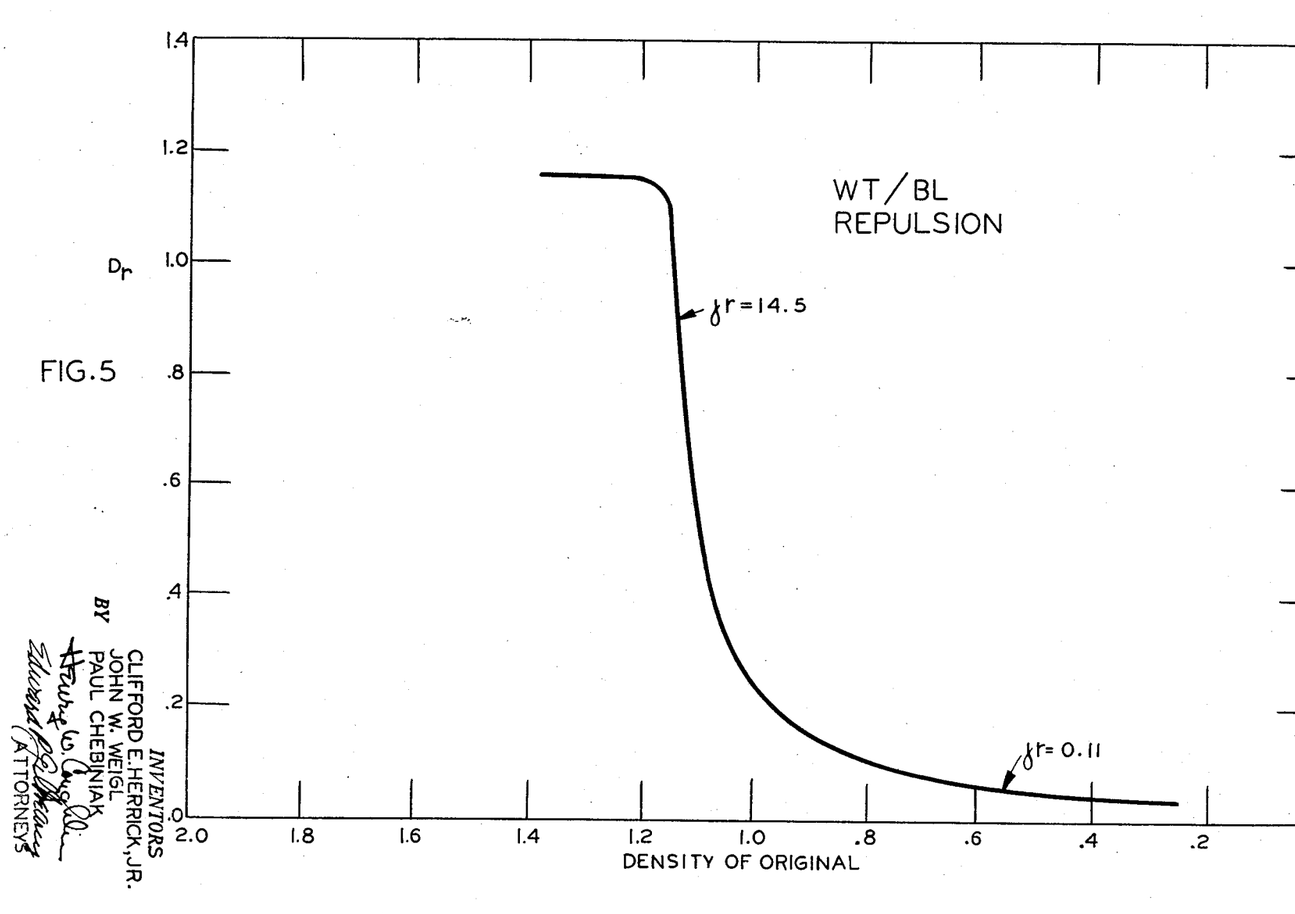
Figure 8:
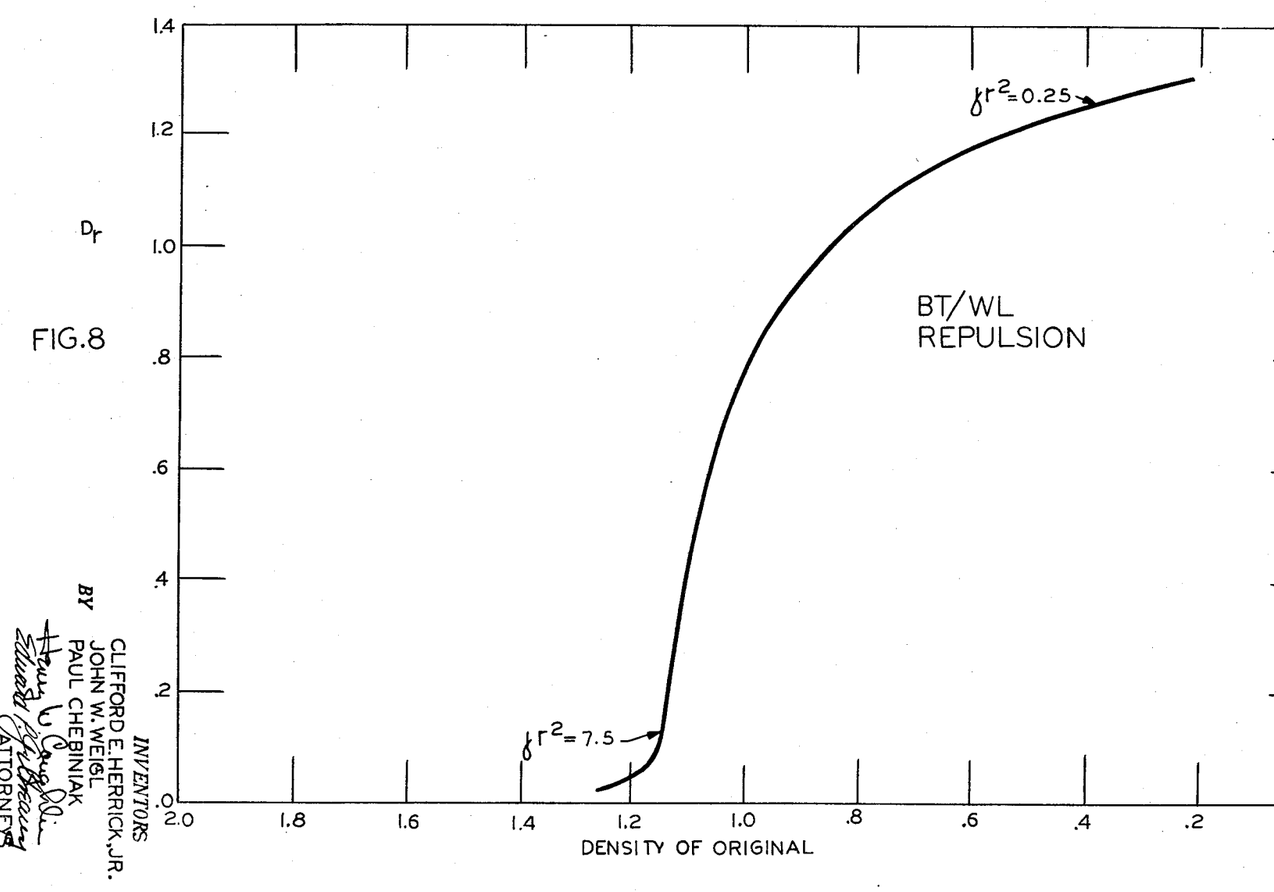
FIG. 8 is a sensitometric curve of an electrophotographic element using conventional rose-bengal-sensitized zinc oxide in which the image is repulsion-developed by means of a black toner powder (Situation B).
Figure 9:
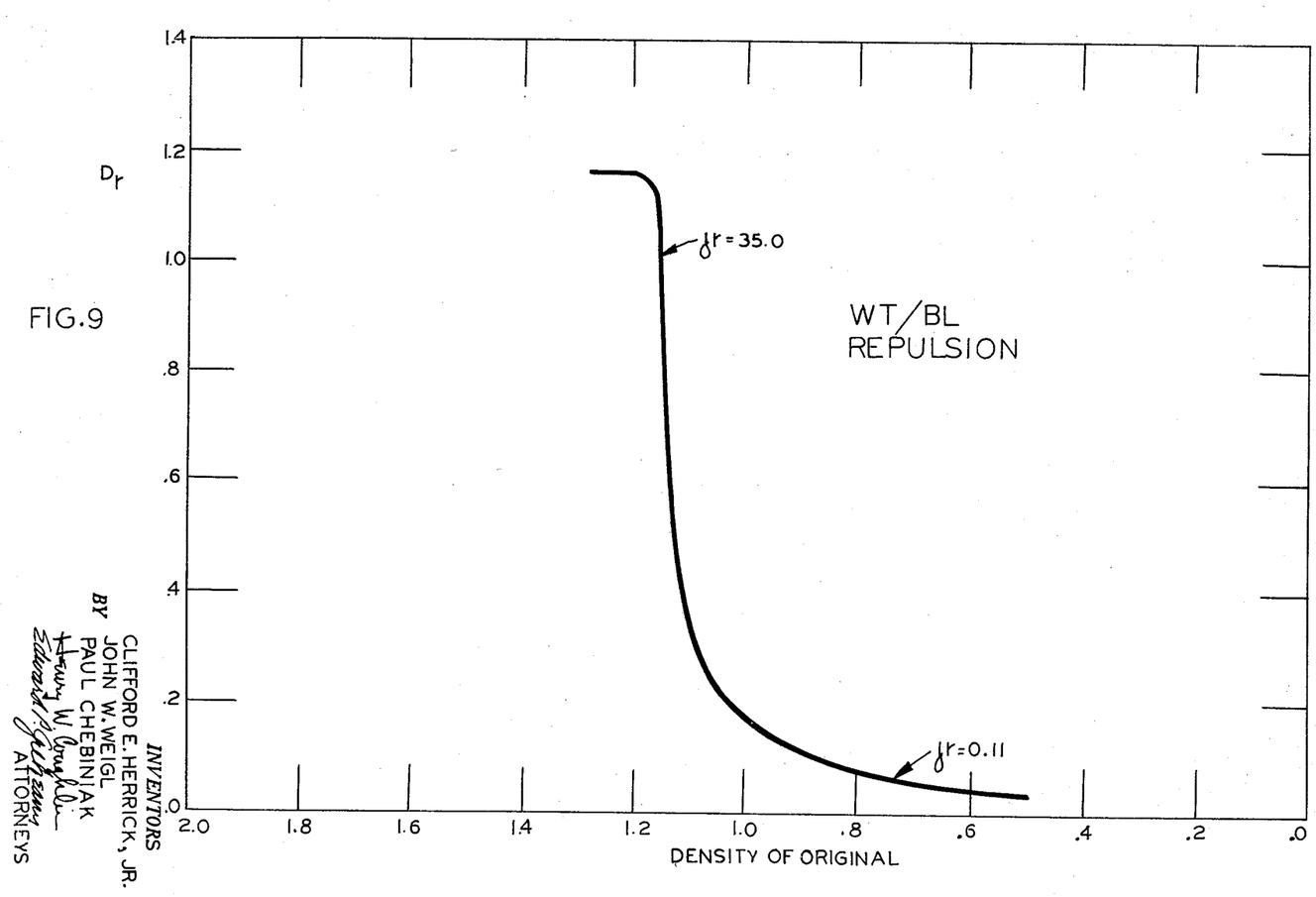
FIG. 9 is a sensitometric curve of an electrophotographic element using dye-sensitized zinc oxide as photoconductor in admixture with a black insulating powder in which the image is repulsion-developed by means of a white toner powder (Situation D).

FIGS. 4 and 8 represent situation B and in this repulsion development situation sensitization of the zinc oxide brings about a steepening of the curve in some portions. This steepening due to zinc oxide sensitization also occurs in situation D, as represented in FIGS. 5 and 9.

Figure 1:
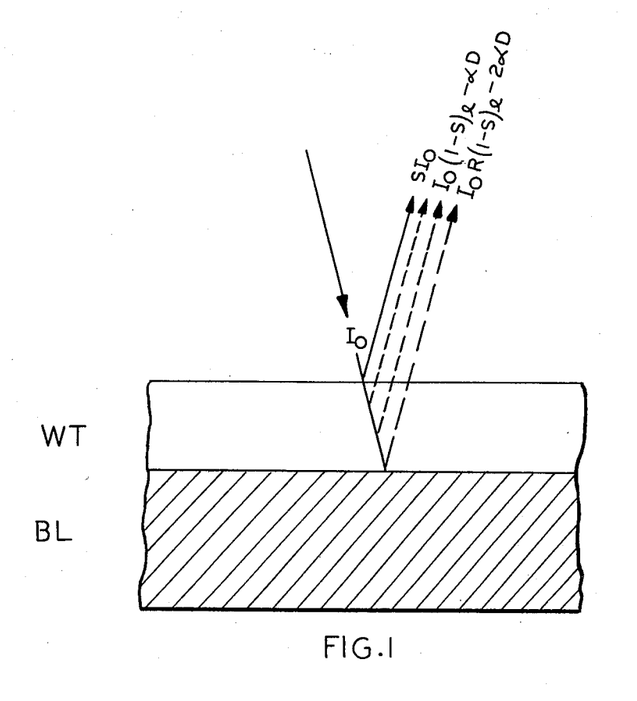
FIG. 1 represents schematically a cross section of the electrophotographic elements described herein. The purpose of this figure is to illustrate the scattering of light rays by means of the white toner developing powder.

FIG. 1 represents schematically a "white-on-black" imagewise reproducing layer consisting of an imagewise deposited layer of light-reflecting white pigment lying above a dark, opaque (poorly reflective) background, such as a black photoconductive layer (BL). A light ray of intensity, $I_o$, is directed towards the upper surface of the light-reflecting "white toner" (WT) layer. At the upper surface of this layer, the incident beam undergoes a loss of intensity in the amount, $SI_o$, due to specular reflection from this surface, where S is the specular reflectivity of the surface. Thus, light in the amount $SI_o$ is reflected back towards the observer and light in the amount of $(I_o-SI_o)$ is transmitted into the interior of the WT layer.

The specular *transmission* density of the WT layer is designated as D, where the visual density D is assumed to arise solely from reflection (scattering) by the pigment particles. Then the amount of light transmitted by the WT layer to the BL layer is $(I_o-SI_o)(e^{-\alpha D})$, where $\alpha = \log_e 10 = 2.303$. Since the density D is assumed to arise solely from scattering, it is clear that light not transmitted to the backing layer must be scattered back towards the observer and the light thus scattered has the intensity $(I_o-SI_o)(1-e^{-\alpha D})$.

If the backing material (BL) has a reflectivity R, the intensity arising from this reflection is simply R $$(I_o-SI_o)e^{-\alpha D}$$

The light reflected from the backing on retraversing the WT layer will be attenuated due to scattering in the amount $e^{-\alpha D}$, so that the net amount which reaches the front surface is simply $R(I_o-SI_o)e^{-2\alpha D}$. Summing up the total reflected light ($I_r$) going upward through the top surface and which thus reaches the observer, the following is obtained:

(Eq. 1) $I_r = SI_o + (I_o-SI_o)(1-e^{-\alpha D}) + R(I_o-SI_o)e^{-2\alpha D}$ and, hence, the reflectance ($r$) of the composite of WT over BL is:

(Eq. 2) $r = (I_r/I_o) = S + (1-S)(1-e^{-\alpha D}) + R(1-S)e^{-2\alpha D}$

The reflection density of the reflecting surface is defined by the relation:

(Eq. 3) $D_r = -\log 10(r/r_w)$ where $r_w$ is a reflectance of a layer which by definition is taken to be "white" to the eye; $r_w$ is normally from 0.7 to 0.8. Hence, in terms of the density of the WT layer, the reflection density of the composite layer, $D_r$, is:

$$D_r = -\log_{10}\left[\frac{S+(1-S)(1-e^{-\alpha D})=R(1-S)e^{-2\alpha D}}{r_w}\right]$$

Using Equation 4 and neglecting the specular reflectivity, the contrast of the composite layer is given by:

(Eq. 5) $\gamma_r = \gamma_s\left[\dfrac{e^{-\alpha D}-2Re^{-2\alpha D}}{1-e^{-\alpha D}+Re^{-2\alpha D}}\right]$ where $\gamma_s$ is the sensitometric curve slope relating the light scattering (or transmission) density of the reflecting layer (WT) to log exposure, and $\gamma_r$ that for reflection density.

Since the image-forming process consists of a variation in the amount of reflecting substance laid down above the non-reflecting backing, we must concern ourselves especially with the contrast ($\gamma_s$) with which the density of the reflecting substance itself is laid down, which in any electrostatic electrophotographic system is related to the change of surface charge density with illumination. For $D \approx 0$, this equation reduces to:

$$\gamma_r = \gamma_s\left[\frac{(1-2R)}{R}\right]$$

Since R, the reflectivity of the dark photoconductive layer, can be made roughly equal to 2%, $\gamma_r$ can be as high as (0.92/.04) $\gamma_s = 23\ \gamma_s$ in the region of high reflection density ($D_r$) and low transmission density (D). Hence, at low transmission densities of the light reflecting layer, where the reflection density of the over-all composite is high, the contrast of the "white-on-black" developed print is very much greater than the contrast of the electrostatically controlled attraction process by which the reflecting layer is laid down. On the other hand, at high transmission density (which corresponds to the low reflection density region of the reflection print), the contrast of the over-all process is very much less than the electrostatically determined contrast with which the reflecting powder layer is itself laid down if the usual attraction development is used. (For example, if $D=1$, $\gamma_r \approx \gamma_s/10$.) The net result is to produce in attraction-developed "white-on-black" prints a much more uniform sensitometric response than that by which the reflecting layer itself is laid down, and by which conventional "black-on-white" prints are produced. In fact, $\gamma_s$ and $\gamma_r$ interact to produce a nearly ideal, wide-latitude sensitometric response in the "white-on-black" process. This effect is brought out by comparing the curve of FIG. 3, which shows the effect of white "toner" particles attracted to a substantially black background, to the curve of FIG. 2, which shows the conventionally used black toner particles on a light-colored surface. It is obvious that the steep sensitometric curves produced by applying black toner to a light background are flattened by a very substantial factor by the addition of a relatively inert insulating black powder to the photoconductor and development of images on the resultant, substantially black sheet by means of a white toner powder.

On the other hand, "reversal" or "repulsion" development by white toners of electrostatic images on black photoconductors (Situation D), as shown in FIG. 5, leads to very steep shadow contrast while the "toe" region remains excessively "soft." Although the sensitometric curve of the white-on-black, reversal-toning system is so steep as to make it manifestly unsuitable for continuous-tone rendition, it is, nonetheless, specifically suitable for certain other applications. With proper exposure control, it can be used, for example, to raise the contrast of faint pencil lines on original drawings on the reproduction. The steep shadow contrast is also useful in light-spot electrophotography of the sort employed in making graphic records of light-spot galvanometer readings (or light-spot oscillographs), high-contrast facsimile transmission systems and the like. In these applications, illumination and exposure times can readily be maintained constant at all times at the proper exposure level and the extreme shadow contrast serves to good advantage to yield maximum effective image resolution.

EXAMPLES

Our invention is illustrated further by the following examples although they are included for purposes of illustration only and are not to be construed as limiting the invention in any way.

Example I

On electrophotographic element was produced in the following manner: Into a Waring Blendor was placed

| | Parts by weight |
|---|---|
| Toluene | 100 |
| Photoconductive zinc oxide powder | 160 |
| Plasticizer | 3 |
| Hydrocarbon resin | 20 |
| Styrene-butadiene copolymer | 30 |
| Insulating carbon black | 2 |

The mixture was vigorously agitated until a uniform dispersion of zinc oxide and carbon black particles was obtained. The composition was coated on a black conductive paper base by means of a Bird applicator. (Other suitable coating procedures are known in the art and need not be further elaborated upon.) Upon drying, there was obtained an extremely smooth film having a uniform thickness of 0.0005 inch and a deep blue-black color. The visual diffuse reflection density of the coating was 1.40 to 1.45.

The electrophotographic element prepared as described above was placed, photoconducting layer face up, on a grounded aluminum plate and a corona discharge unit connected to a source of negative potential of approximately 7 kilovolts was passed over the photoconducting element several times in the absence of actinic illumination in order to form a layer of negative charges having an equilibrium potential of approximately 400 volts relative to the grounded backing plate.

The charged element was exposed for a period of 20 seconds under a photographic negative to the light of a 75-watt incandescent lamp placed at a distance of 25 inches from the element. The electrostatic latent image was then developed by applying a positively charged white toner powder by means of a magnetic brush and fusing the powder to the photoconductive layer by gentle heating. A reversed image was obtained, that is, portions of the original negative which were black or opaque appeared white in the image, since the white powder adhered where the layer was protected from the light, the positively charged white powder being attracted most strongly to the non-illuminated areas, but less to the exposed areas, according to the extent of actinic exposure.

The white toner developing powder used in this example was prepared by thoroughly dispersing 25 parts by weight of titanium-dioxide and 50 parts of urea-formaldehyde resin in 100 parts by weight of toluene. The solvent was then evaporated off and the residue ground to a fine powder. Particles able to pass a 200 mesh per inch sieve were used for toner powders.

The zinc oxide used as photoconductor for this coating was of a grade sold under the name of "Florence Green Seal-8" by the New Jersey Zinc Company of Palmerton, Pa. The plasticizer used was purchased from the Hercules Powder Company, Wilmington, Del. under the name "Hercoflex 150." The hydrocarbon resin used was purchased from the Pennsylvania Industrial Chemical Corporation, Clairton, Pa. under the name of "Piccopale 100." The styrene-butadiene copolymer was obtained from the Goodyear Tire and Rubber Company, Inc., Akron 16, Ohio, under the name "Pliolite S–50." The urea-formaldehyde resin used in formulating the white toner powder was purchased from the Rohm and Haas Chemical Company under the name "Resemene."

Example II

The same procedure was followed as given in Example I except that the photoconducting layer was given a positive corona discharge which imparted a positive charge to the photoconducting layer. Upon exposure to a photographic negative followed by development with the positively charged white toning powder used in Example I (which was repelled preferentially from the non-illuminated areas), there was obtained a contrasty direct or positive image.

Example III

The same procedure was followed as presented for Example I except that a negatively charged white toner powder was used to develop the negative charge latent image on the blackened base. This procedure produced a highly contrasty direct or positive image since the white toner powder was repelled from the negatively charged non-light-struck areas and attracted to the partially discharged areas in the light-struck regions.

Example IV

A photoconductive composition was prepared by thoroughly dispersing 30 parts of zinc oxide and 10 parts of a black nonconductive resin known as Asphaltum and 50 parts of Stoddard solvent, a commercial mineral spirits (aliphatic petroleum) solvent of boiling range of 150–190° C. The Asphaltum resin was purchased from the Litho Chemical and Supply Company of Lynbrook, N.Y. as "Deep Etch Asphaltum Developing Ink Solution No. 3007." The dispersion fo photoconductor was then coated on a conductive base essentially as described in Example I. The coating obtained after evaporation of the solvent was approximately 0.0005 inch thick and was of a neutral black color. The layer was charged, exposed, toned and fixed according to the method described in Example I. There was obtained excellent continuous-tone rendition of the photographic positive transparency which was used as the original.

Example V

The same procedure was followed as given in Example IV except that the non-conductive Asphaltum was replaced by black Gilsonite resin (Harshaw Chemical Corporation, Cleveland, Ohio).

Example VI

The same procedure was followed as given in Example IV except that the non-conductive Asphaltum was replaced by an aromatic-soluble asphalt which was purchased from the Pennsylvania Industrial Chemical Corporation, Clairton, Pa. under the name "Transphalt 100."

Example VII

A direct comparison of the sensitometric properties of electrophotographic images produced by the conventional black-on-white versus the novel white-on-black systems was carried out in the following manner:

A white zinc oxide electrophotographic plate (A) was prepared in the usual way.

A second plate (B) was prepared as above except that 10% by weight of the zinc oxide was replaced by non-conductive carbon black in order to render the layer substantially black.

In both cases, a negative electrostatic charge density equivalent to 400 v. (relative to the grounded conductive backing of the layer) was applied to the outer face of the photoconductive layer by means of a corona discharge unit. The same calibrated silver halide film step-wedge was placed over each. The "conventional" sheet was exposed for 18 seconds to 2.6 milliwatts/cm.$^2$ of white tungsten light; the black sheet was exposed for 50% longer (27 seconds) to overcome the partial masking of light by the carbon black.

Black electropositive toner powder (Hunt type 4A toner, Philip Hunt Company, Palisades Park, N.J.) was applied to the "conventional" white sheet by means of a "magnetic brush." White electropositive toner of the type previously described was applied to the black sheet by similar means.

FIG. 2 shows the results obtained when the conventional negatively charged white zinc oxide sheet was *attraction*-developed with positively charged black toner to yield a direct image of the original. The contrast was found to be excessive over much of the exposure range and highly variable throughout, making exposure conditions very difficult to control. Typical reflection-density/log-exposure slopes ("$\gamma_r$"), which are marked along the curve, show that a given exposure increment can cause density changes varying by a factor of eight, depending on where on the curved one may be operating. On the other hand, FIG. 3, shows the obvious improvement in gradation and exposure range which has been achieved in *attraction*-developing a similar but blackened paper by means of our novel white-on-black toning process; a contrast ratio close to unity prevails over a 6-fold exposure range. It follows that exposures within this range will render truly continuous-tone reversed images, and that a given amount of exposure confers upon the final image the same density increment as the same exposure anywhere else within this wide latitude.

In order to test the results for *repulsion* development, black *electronegative* toner (Hunt type 5, purchased from the aforementioned Philip Hunt Company) was applied to a negatively charged conventional white electrophotographic sheet after step-wedge exposure by means of a magnetic brush; and white *electronegative* toner was applied to a sheet of the novel carbon-blackened electrophotographic paper based on unsensitized zinc oxide. FIGURE 4 shows that the sensitometric curve for conventional repulsion toning is steep and badly curved. This accounts for the poor exposure latitude exhibited by conventional light-colored electrophotographic materals when used with black repulsion toner.

As FIG. 5 shows, the use of white toner on the novel blackened electrophotographic sheet for repulsion development actually serves to accentuate the steepness and variable slope of the curve; therefore, the sensitometric properties of the novel white toner/dark photoconductor *repulsion* system are even further from continuous-tone response than those of the conventional black toner/white photoconductor repulsion system. However, as was pointed out in the theory section, the very steepness of the response curve makes it especially useful for a few specialized purposes such as line copy and the like.

Example VIII

Another direct comparison between the sensitometric properties of the conventional black-on-white and the novel white-on-black toning system was carried out but in which the zinc oxide was dye-sensitized.

A conventional pink, rose-bengal-dyed zinc oxide electrophotographic plate (A) was prepared. A second plate (B) was prepared similar to the above except that 10% of the zinc oxide was replaced with a non-conductive carbon black in order to render the layer substantially black.

In both cases, a *negative* electrostatic charge density equivalent to 400 v. (relative to the grounded conductive backing of the layer) was applied to the outer face of the photoconductive layer by means of a corona discharge unit. The same calibrated silver halide film step-wedge was placed over each. The conventional sheet was exposed for 2 seconds to 2.6 milliwatts/cm.$^2$ of white tungsten light; the black sheet required 3 seconds for comparable exposure. It is to be noted that the white-light exposure required by even the blackened dye-sensitized sheet was about one-sixth that required by the conventional white sheet; this shows the practical advantage in light sensitivity of the novel white toner/blackened photoconductor system.

The results for the dye-sensitized zinc oxide plate shown in FIGS. 6, 7, 8 and 9 parallel those for the white sheets discussed above. It will be seen that the contrast for the dye-sensitized paper, illuminated with visible light strongly absorbed by the dye, is inherently greater than that for white (ultraviolet-sensitive) paper, illuminated mainly with visible light which is absorbed weakly and, therefore, more uniformly throughout the thickness of the zinc oxide layer. Conventional black toner/white photoconductor attraction or repulsion development leads to severely contrasty response over much of the exposure range, and exposure latitude is poor. Further, the pink-color background gave an aged and unattractive appearance to the sheet. Novel white toner/blackened photoconductor *repulsion* development makes the response curve even steeper and more curved ($\gamma_r$ varying between 14.5 and 0.11). On the other hand, *attraction* development of a blackened photoconductor with white toner leads to an entirely satisfactory response curve, having a 6-fold, continuous-tone contrast exposure range at $\gamma_r \approx 1.15$, with a gradual decrease of contrast only at highest exposures.

The two methods of obtaining reversed images on dye-sensitized paper can be summed up as follows:

BT/WL (by repulsion toning)—$\gamma_r$ varies 30-fold (from 7.5 to 0.25)

WT/BL (by attraction toning)—$\gamma_r$ at most varies 2-fold (from 1.15 to 0.55)

Clearly, attraction development by the novel white toner/ blackened photoconductor system yields reversed images of excellent tonal quality. Further, the use of darkened zinc oxide photoconductive layers, as proposed herein, masks the undesirable background color at the same time that attraction development with light-colored (preferably white) toner powder results in reversed prints of vastly improved continuous-tone response.

It is therefore worth the effort to improve the sensitometric and other shortcomings of zinc oxide as outlined above, by the addition of darkening additives to zinc oxide electrophotographic layers. While such black additives are not photoconductive and will partially mask the light incident upon the photosensitive zinc oxide pigment, the resultant loss in effective actinic illumination is more than offset by the great overall gain in sensitivity to visible light. Thus, for the first time, it is feasible to use deeply dyed zinc oxide in practical, aesthetically acceptable coatings. For example, zinc oxide mixed with about 1 to 50 percent by weight of black, substantially insulating powder when incorporated in a photoconductive layer resulted in an up to 5-fold loss in sensitivity over a conventional all-white zinc oxide layer. However, by using heavily dyed zinc oxide in admixture with black powder, the over-all effect is an increase in the inherent sensitivity of the photoconductor to visible light by about 30-fold. This represents a 6-fold over-all net gain in useful sensitivity by the combination of black additive and heavily dyed photoconductor.

What is claimed is:

1. An electrophotographic element capable of yielding images having improved continuous tones when developed by attraction development with a light-colored toner comprising a conducting base and on one side thereof a black adherent photoconductive coating of substantially uniform thickness and high electrical dark resistivity, said coating comprising a binder having dispersed therethrough a mixture of a photoconductive dye-sensitized zinc oxide, the zinc oxide supplying the entire photoconductivity of the coating, and an insulating black powder of high dielectric resistance, the electrical resistivity of which is higher than that of zinc oxide when illuminated, in a small amount, sufficient to provide a photoconductive coating which appears to the eye to be substantially black.

2. The product as defined in claim 1 in which the photoconductive coating has an electrical resistivity of from $10^{10}$ to $10^{14}$ ohms/cm. and the black powder is present in said mixture in the amount of about 1 to 50% based on the amount of zinc oxide.

3. The product as defined in claim 1 wherein the black powder is carbon black.

4. The product as defined in claim 1 wherein the black powder is a black Asphaltum residue.

5. The product as defined in claim 1 wherein the base is a paper base.

6. The product as defined in claim 1 wherein the binder is selected from the class consisting of silicone resins, cellulose resins, cellulose ethers, aliphatic vinyl resins, polystyrene, paraffin wax, alkyds, carnauba wax and shellac.

7. The product as defined in claim 1 wherein the binder is a silicone resin.

8. The product as defined in claim 1 wherein the dye used in sensitizing the zinc oxide is selected from the group consisting of rose bengal, fluorescein, chlorophyll, methyl green, oxonols, hemioxonols, and cyanines.

9. The product as defined in claim 1 wherein the dye for sensitizing the zinc oxide is rose bengal.

10. A method for producing improved continuous-tone electrophotographic images which comprises charging the surface of the electrophotographic element of claim 1, exposing the charged photoconducting element to a light pattern without significantly heating the photoconductive element and developing by attraction development the so-formed electrostatic image with a substantially white tone powder, to obtain a visual image with a gamma ranging from 0.55 to 1.15.

11. The method as described in claim 10 wherein the zinc oxide is sensitized with rose bengal.

12. As a new composition of matter a mixture consisting essentially of panchromatically sensitized zinc oxide and an electrically insulating black powder of high dielectric resistance, said zinc oxide supplying the entire photoconductivity of the composition, in the amount of about 1 to 50% based on the weight of the zinc oxide and sufficient to give a substantially black color to the mixture.

References Cited

UNITED STATES PATENTS

| | | | |
|---|---|---|---|
| 2,287,161 | 6/1942 | Ball | 96—1.8 X |
| 2,727,807 | 12/1955 | Thomsen | 96—1.8 X |
| 2,937,944 | 5/1960 | Van Dorn et al. | 96—1.8 |
| 2,993,787 | 7/1961 | Sugarman | 96—1.8 |
| 3,052,540 | 9/1962 | Greig | 96—1.7 |
| 3,121,006 | 2/1964 | Middleton et al. | 96—1.5 |
| 3,378,371 | 4/1968 | Jarvis | 96—1.8 |

FOREIGN PATENTS 201,301   3/1956   Australia.

GEORGE F. LESMES, Primary Examiner

C. E. VAN HORN, Assistant Examiner

U.S. Cl. X.R.

96—1; 252—501, 511